United States Patent [19]

Rohloff

[11] 4,326,140

[45] Apr. 20, 1982

[54] ELECTRIC MOTOR HAVING A HOOK-SHAPED COMMUTATOR

[75] Inventor: Rolf Rohloff, Lengfeld, Fed. Rep. of Germany

[73] Assignee: Siemens Aktiengesellschaft, Munich, Fed. Rep. of Germany

[21] Appl. No.: 947,523

[22] Filed: Oct. 2, 1978

[30] Foreign Application Priority Data

Oct. 3, 1977 [DE] Fed. Rep. of Germany ....... 2744419

[51] Int. Cl.³ ............................................. H02K 13/04
[52] U.S. Cl. .................... 310/234; 310/114; 310/236
[58] Field of Search .................. 310/233–237, 310/180, 184, 198–208, 112, 114, 136–142; 174/138; 29/507, 597

[56] References Cited

U.S. PATENT DOCUMENTS

| | | | |
|---|---|---|---|
| 441,487 | 11/1890 | Harrington | 310/233 |
| 1,030,061 | 6/1912 | Elshoff | 310/233 |
| 2,658,158 | 11/1953 | Bender | 310/234 |
| 3,061,749 | 10/1962 | Hohler | 310/234 |
| 3,223,869 | 12/1965 | Reisnecker | 310/234 |
| 3,448,311 | 6/1969 | Mommensen | 310/234 |

FOREIGN PATENT DOCUMENTS 2530294 1/1977 Fed. Rep. of Germany ...... 310/112

*Primary Examiner*—R. M. Skudy
*Attorney, Agent, or Firm*—Kenyon & Kenyon

[57] ABSTRACT

An electric motor having a hook-shaped commutator about which more than one coil wire per hook is wound with the coil wire making contact with the commutator segment has a hook formed at the winding end face of a commutator segment, the hook base extending below the outer surface of the face, the hook being bent in the direction of a depression which corresponds to the diameter of a first coil wire formed between the hook and the face of the segment and is located at the outer edge of the face so that when a second coil wire is inserted it will necessarily be located in direct contact with the hook and radially above the first wire which will lie, at least in part, below the outer surface of the face.

8 Claims, 10 Drawing Figures

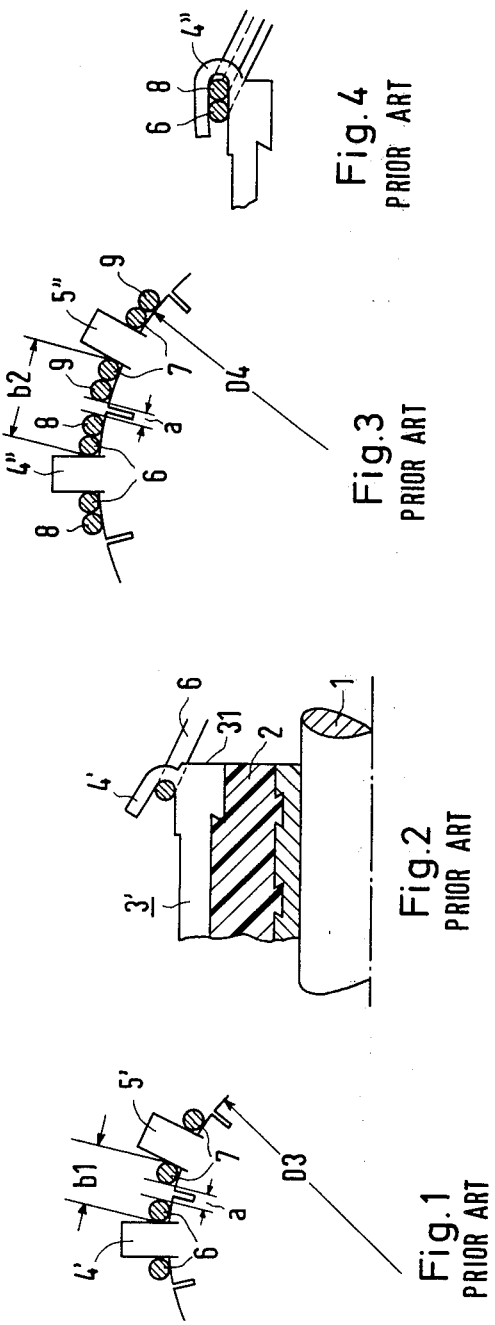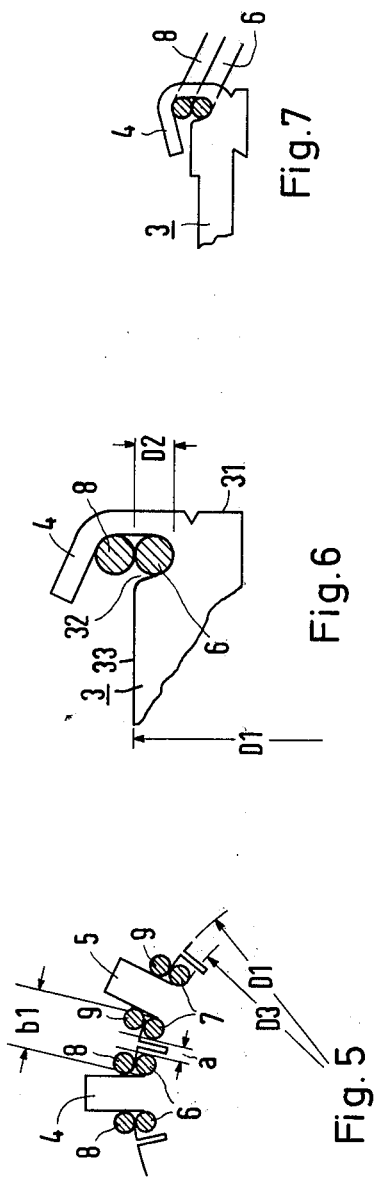

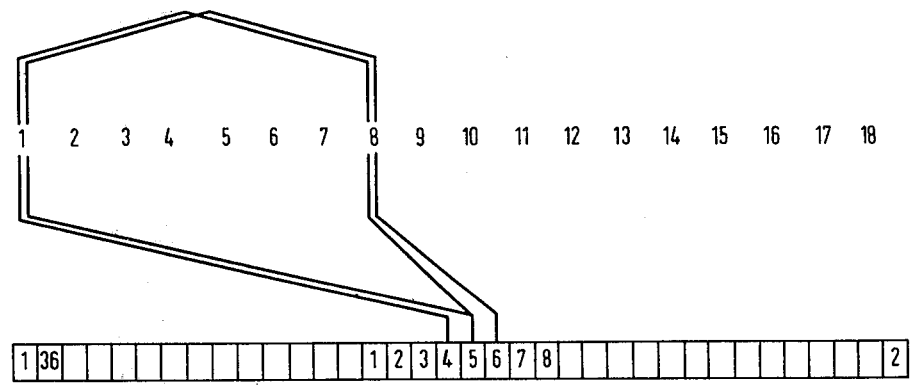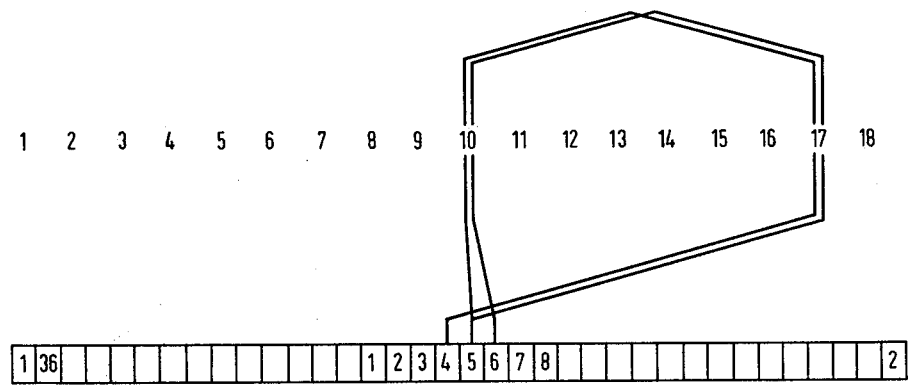
Fig.10

4,326,140

ELECTRIC MOTOR HAVING A HOOK-SHAPED COMMUTATOR

BACKGROUND OF THE INVENTION

The invention relates to an electric motor having a hook-shaped commutator. There is disclosed a commutator segment which carries on its winding side, a hook, the hook having a bent, free end which accepts at least two radially superposed wires of the armature winding of the electric motor per commutator segment.

DESCRIPTION OF PRIOR ART

In one known such electric motor with a hook-shaped commutator (shown in German Auslegeschrift No. 11 34 151), a section of a surface layer of a collector is lifted off by a peeling operation, starting from the face of the collector. This peeled section forms a hook which opens towards the winding end face. The web of a U-shaped terminal lug is then placed on the surface bared by the peeling operation and fastened by closing the hook. Two ends of the armature winding are inserted between the legs of the terminal lug and clamped so as to be arranged radially one above the other on the outside surface of the commutator.

German Auslegeschrift No. 23 28 698 shows a collector having a hook-shaped commutator, with each hook accommodating a single wire in which the hooks are formed on the winding end faces of the commutator segments and have a particular size which is defined in relation to the wire diameter, this size being smaller than the diameter. Those hooks are formed below the outer rim of the winding end face.

SUMMARY OF THE INVENTION

It is an object of this invention to provide an electric motor having a hook-shaped commutator to which more than one looped coil wire can be placed in contact and fastened, this being accomplished by simple means and without the need for substantial enlargement of the space required for the commutator and its coil wire connection.

One obtains this result in accordance with this invention, in an electric motor of the kind described at the outset, by forming a hook on the winding side end of the segment below the outer edge of the face. The hook is bent towards a depression whose diameter corresponds to the diameter of the first coil wire and which is formed between the hook and the collector face of the segment in such a manner that, when another coil wire is inserted, it is likewise placed in direct contact with the hook and, by necessity, is placed radially above the first wire which lies, at least in part, below the outer edge of the face. In this way, when the armature is being wound, the first wire is locked in the depression when being looped around the hook, and when the second coil wire is looped around subsequently, it positions itself automatically and without the aid of additional connecting means such as separate terminal lugs radially above the first coil wire. By this means one avoids substantial enlargement of the commutator diameter which would have been necessary if the two coil wires were arranged, one next to another, in a circumferential direction.

The securing of the first coil wire can be improved if the outer edges of the faces of the commutator segments are provided with a fillet which corresponds in size to the coil wire.

Particularly useful applications of the electric motor with hook-shaped commutator designed in accordance with the invention are in regard to two motor drives such as shown in copending U.S. application Ser. No. 947,522 filed Oct. 2, 1978 and assigned to the assignee of the instant application. This copending application shows a high-pole induction motor and a low-pole universal motor combined on a single, common lamination core. A conventional three-phase induction motor winding and a low-pole universal motor winding are provided in the stator. The rotor, however, is provided with an integrated rotor winding having a particular pole pitch and distributed over the armature circumference in a particular manner. This rotor winding is to be connected to the commutator segments in the rotor which are constructed in accordance with the teachings of this invention. In order to be fully capable of functioning as an induction motor as well as a universal motor, the integrated rotor winding is arranged with a combination of a crossed and uncrossed lap winding. These windings are arranged in such a manner that, on two adjacent segments of the commutator the two ends of a coil having uncrossed lap windings as well as the ends of a particular coil having crossed lap windings, are to be both connected.

By a utilization of the inventive combination of a hook-shaped commutator constructed according to the invention and the particular windings characterized in claims hereinafter described, it is possible to machine-wind the rotor of the electric two-motor drive having integrated rotor windings mechanically in a simple manner, such as, for example, by means of a so-called flyer. This can be done without having substantially to enlarge the diameter of the commutator beyond the diameter of a commutator having the same dielectric strength of a conventional, simple universal motor having only one coil wire per hook.

BRIEF DESCRIPTION OF THE DRAWINGS

FIG. 1 shows a radial partial section of a conventional commutator, with only one coil wire per hook;

FIG. 2 is corresponding longitudinal section of FIG. 1;

FIG. 3 shows a radial partial section of a conventional commutator with two coil wires wound around each of its hooks;

FIG. 4 is an axial partial section of FIG. 3;

FIG. 5 depicts a radial partial section of a commutator according to the invention with two coil wires wound around each of its hooks;

FIG. 6 is an axial partial section of FIG. 5 after the insertion of the coil wires, but before the final bending of the hook;

FIG. 7 shows the partial section according to FIG. 6, but with hook 4 bent in its final shape;

FIG. 10 shows the plan of an 8/2 pole-changeable integrated rotor winding.

DETAILED DESCRIPTION OF THE DRAWINGS

Figure 8:
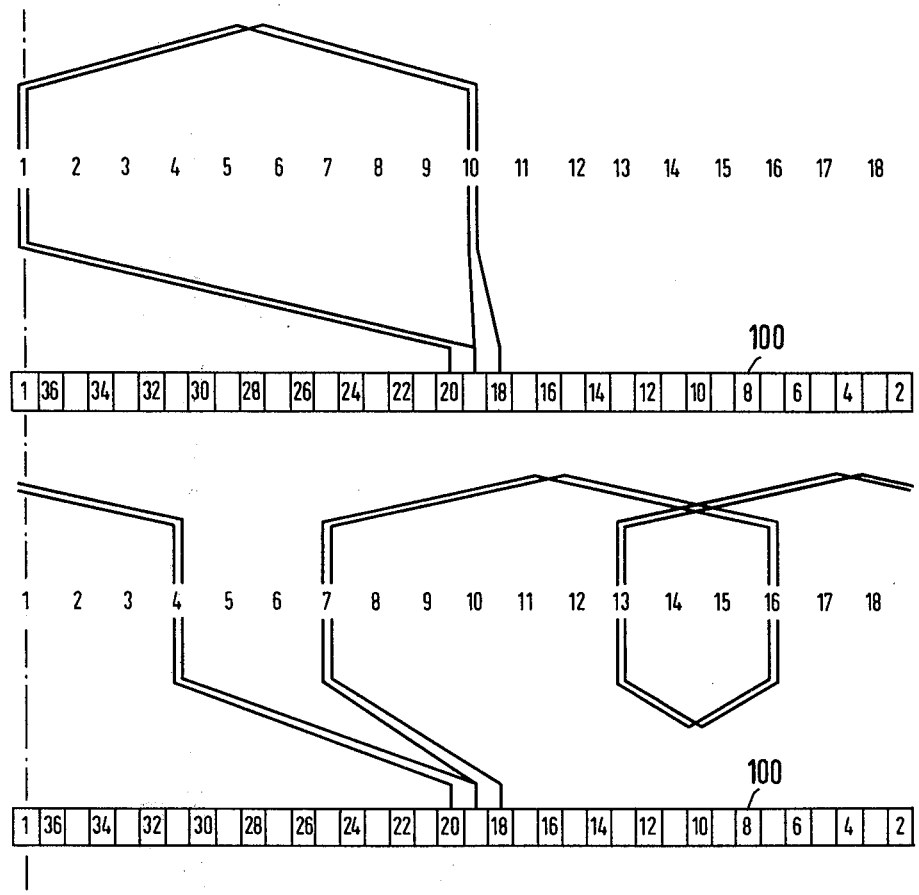
FIG. 8 shows the winding plan of an integrated rotor winding for a 6/2 pole-changeable drive motor.

Referring to FIGS. 1–7, there is seen embedded in an insulating material 2 (FIG. 2) so as to be held concentric to a motor shaft 1, commutator segments 3, 3' which extend into hooks 4, 5 and 4', 5', respectively, on their winding side of the segments. The hooks (which are only partially seen in FIGS. 1, 3, and 5,) are distributed in the usual manner over the entire circumference of a commutator. During machine winding of the arrangement, such as by means of a so-called flyer, coil wire 6 shown in cross section in FIG. 1, would be looped around the hook 4'. The size of cap b1 (FIG. 1), which is required between two adjacent hooks 4', 5', would be dependent upon the thickness of the coil wire 6, 7 and upon the size of the required insulation gap a between the two adjacent, opposite sides of the coil wires 6, 7. The diameter D3 (FIG. 1) of the outer edge of the winding face 31 (FIG. 2) of the commutator segments is dependent upon the number of commutator segments and their circumferential width.

FIG. 3 shows the required increase in the distance b2 between adjacent hooks 4" and 5" when, in addition to first wires 6, 7, a second wire 8, 9 is machine-looped around those hooks. As is apparent, this will necessarily result in an increase in the radius of the outer edge of the winding end face of the commutator to a dimension D4, even though the hook width, wire diameter, and insulation spacing a are held constant.

FIG. 5 shows the commutator constructed in accordance with the teachings of the invention in which the two wires 6, 8 and 7, 9 are successively looped around the hooks 4 and 5 and are automatically positioned radially on top of the other. As is seen in FIG. 6, this automatic positioning of the wires on top of each other results from the fact that the hook 4, which is formed on the winding end face 31 of the commutator segment, is formed below the surface of the outer edge (D1) of the face 31 and, as is seen in FIG. 6, forms a depression which corresponds to the diameter D2 of the first coil wire 6. Initially the hook 4 is bent so as to be positioned in the radial direction extending away from the shaft 1 so that the second coil wire 8 will be able to be disposed radially above the first looped coil wire 6. Subsequently, as is seen from FIG. 7, the pre-bent knee of the upper end of the hook 4 is bent towards the surface of the commutator segment so that both coil wires 6, 8 will be retained, one on top of the other, in a radial position and not side-by-side in a circumferential manner as is seen in FIG. 4. The resultant diameter D1 (FIG. 5) of the outer edge of face 31 for a given hook width, coil wire diameter, and insulation spacing a, is larger than the diameter D3 (FIG. 1, FIG. 5) only by an amount equal to the diameter D2 of the coil wire 6, 7 inserted in the depression, while maintaining the spacing b1 (FIGS. 1, 5) between two adjacent hooks 4', 5' or 4, 5. In a normal two wire arrangement as seen in FIG. 3, this spacing, as mentioned, would have to be greater, as is seen at b2 in FIG. 3.

Although the hook 4 could be formed so as to extend radially from the face by an additional amount equal to one wire thickness to thereby provide space for the additional wire without further altering the surface of the face, according to one embodiment of the invention, as seen in FIG. 6, the faces 31 of the segments 3 are provided at their outside edges D1 with a depression 32 corresponding in size to the coil wire 6. In this manner, there need be no axial enlargement of the commutator since depression is provided in a section which is not intended for the running surface of the segment for production reasons.

As is seen in FIG. 6, a first wire 6 is located in a depression 32 which extends below the outer surface 33 of the segment by a distance (D2) substantially corresponding to the diameter of the wire 6. The lower part of the radially extending shaft of the hook forms one wall of the depression 32 with the upper part of this hook shaft retaining the second wire, the shaft of the hook being that part extending between the hook base and hook knee. It is seen that the radially extending hook shaft, starting from its base which is integral to, and an extension of, winding face 31 and extending to the knee of the hook substantially corresponds to two wire diameters, with the radially upper part of this shaft restraining the second wire. Thus, the base of the hook is below the outer surface 33 of the segment at a distance corresponding to one wire diameter and the knee of the hook is above this outer surface at a distance also corresponding to one wire diameter, with the shaft of the hook substantially corresponding in length to two wire diameters and extending in the radial direction.

Figure 9:
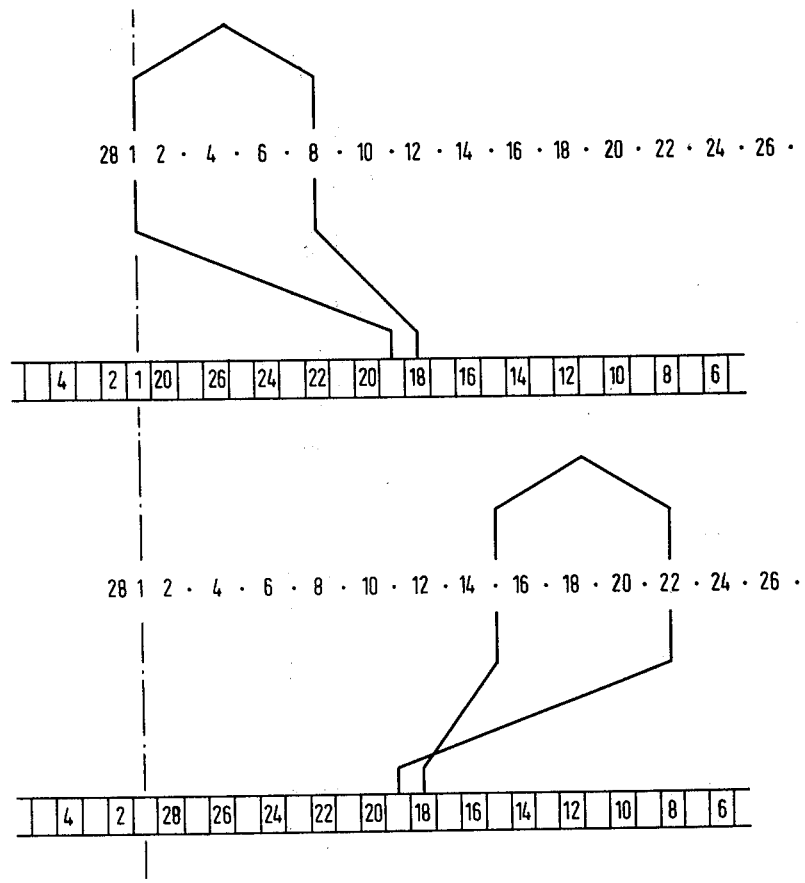
FIG. 9 shows the winding plan of the integrated rotor winding of a 12/2 pole-changeable drive motor.

FIGS. 8–10 show winding systems in which the hook commutator, according to the invention, finds particular application. FIG. 8 shows commutator 100 having 36 segments and a winding section of an integrated rotor winding of a 6/2 pole-changeable two-motor drive, with the rotor having 18 slots. Shown in the upper part of FIG. 8 is a portion of the total winding system in which an uncrossed coil has its coil width arranged on the rotor circumference. Two coil sides occupy slots 1 and 10, with the coil accordingly being divided into two partial coils. The lower part of FIG. 8 shows a series arrangement of a second coil according to the invention, occupying slots 7 and 16 and slots 13 and 4. The two ends of the series arrangement connected as a crossed coil in the lower portion of FIG. 8 are connected to the same segments 18, 19, 20 as are the ends of the uncrossed winding in the upper part of the Figure. In accordance with the excitation required for a 6/2 pole-changeable drive motor, the three coils are arranged over the circumference, having a spacing of 120° and a coil width in accordance with the invention. Each winding shown in the upper and lower part of FIG. 8 is effected in succession by machine, each winding being looped around the hooks of the segments 18, 19 and 20 as shown.

FIG. 9 shows the winding plan of a 12/2 pole-changeable drive motor with 28 rotor slots and 28 commutator segments. In contrast to the FIG. 8 arrangement, the coil is not divided into part coils. In order to keep the noise level low, the fully integrated rotor winding is constructed, as is known in the prior art, with a different number of slots in the stator and armature windings than is conventional. The number of slots in the armature $N_2$ is different from the conventional number of armature slots and is determinable on the basis of number of poles, number of phases and number of slots per pole and phase ($N_2 = 2p \times m_2 \times q_2$). For example, in the winding plan according to FIG. 9, $N_2 = 28$ slots are provided in the rotor, whereas the conventional calculation would have resulted in 24 slots for a 3-phase induction motor stator winding with $N_1 = 36$ slots.

FIG. 10 shows, for use in an 8/2 pole-changeable drive motor, the two partial sections of an integrated 18 slot rotor winding connected to the same 36 segment commutator. The upper part of the Figure shows a coil of the uncrossed lap winding divided into two part coils and connected to the segments 4, 5, 6, and the lower part of the FIG. 9 coil of the crossed lap winding, divided into two part coils and likewise connected to the segments 4, 5, 6.

What is claimed is:

1. In an electric motor having a segmented commutator in which each commutator segment has a contact surface and a hook formed on the end of the segment nearest the motor winding, the bent, free end of the hook serving to fasten and contact at least two wires of the armature winding, the improvement comprising:

the hook formed at the face of the segment body nearest the winding, and a depression in the segment body between the hook and the segment contact surface, the depression fitted to the diameter of a first coil wire for receiving the wire and positioning it in contact with the hook and, at least in part, below the level of the contact surface, the body of the hook having a portion projecting radially relative to the axis of rotation of the commutator and adapted to maintain a second coil wire placed in contact with it radially above the first wire, and a portion of the hook being bent over the outermost wire in the direction of the depression.

2. An electric motor in accordance with claim 1 in which the depression for receiving the first coil wire comprises a fillet fitting for wire.

3. An electric motor in accordance with claim 1 in which the hook is formed on the segment body face and in which the depth of the depression is adopted to receive several coil wires lying radially on top of each other.

4. A commutator segment located at a radial distance from a commutator shafting including (a) means for retaining first and second wire loops disposed radially one above the other on said segment, and in contact with each other;

(b) said means for retaining including a depression in the outer surface of said segment in which the innermost of said wire loops is seated and further including;

(c) a hook having a shaft the lower part of which forms one side wall of said depression and the upper part of which extends in the radial direction a distance at least corresponding to the sum of the diameters of said two radially disposed loops.

5. The commutator segment according to claim 4 wherein the portion of said hook which forms said side wall of said depression is located below said outer surface of said segment.

6. In an electric motor having a commutator segment adapted to be connected to at least two rotor wires, said commutator segment including:

(a) an upper surface having therein (b) a depression means for retaining one rotor wire, said depression means extending to a depth below said upper surface, said depth corresponding substantially to the diameter of said first rotor wire;

(c) a hook, the upper part of which extends radially above said upper surface, the lower part of said hook forming one wall of said depression means;

(d) means for holding a second rotor wire at a location radially above said first rotor wire, said means for holding including said upper part of said hook.

7. In an electric two-motor drive which has armature windings wound so as to operate as both commutator and induction motor with the windings having uncrossed lap windings and crossed lap windings wherein more than one wire loop is to be connected to a single commutator segment which is located in a commutator arranged about a shaft, a commutator segment including:

(a) an upper surface being disposed at substantially right angles to a winding face surface of said segment, said upper surface being disposed at a first diameter;

(b) a wire retaining hook which is located on said segment with the base of said hook being located inwardly of said upper surface in the direction of said shaft;

(c) first means for retaining a first wire loop at least partially below the upper surface of said segment, said means for retaining including a depression located in said upper surface, said depression being disposed at a second diameter which is smaller than said first diameter by an amount substantially corresponding to the diameter of said first wire, one wall of said depression being formed by the inner surface of said wire retaining hook;

(d) second means for retaining a second wire loop at a location at least partially above said upper surface of said segment with said second loop disposed radially above said first loop, said second means for retaining including the upper portion of said wire retaining hook.

8. A method for connecting two wires to a commutator segment including:

providing a commutator segment having an outer surface;

providing a prebent wire hook having a shaft extending from the outer surface at one end of the commutator segment;

providing a depression in the surface of the commutator segment adjacent to the shaft, the shaft extending radially from the outer surface of the commutator to the prebent portion for a distance corresponding to the sum of the diameters of the two wires placed one above the other in the depression; and placing the two wires one above the other in the recess and looped against the shaft.

* * * * *